(12) United States Patent
Kudou et al.

(10) Patent No.: US 10,673,228 B2
(45) Date of Patent: Jun. 2, 2020

(54) UNIT

(71) Applicant: FANUC CORPORATION, Yamanashi (JP)

(72) Inventors: Shuuji Kudou, Yamanashi (JP); Yoshinori Sakai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/006,412

(22) Filed: Jun. 12, 2018

(65) Prior Publication Data

US 2018/0358803 A1    Dec. 13, 2018

(30) Foreign Application Priority Data

Jun. 13, 2017  (JP) .................................. 2017-115823

(51) Int. Cl.
*H02H 7/12*     (2006.01)
*H02H 11/00*    (2006.01)
*H02H 1/00*     (2006.01)

(52) U.S. Cl.
CPC ........ *H02H 7/1203* (2013.01); *H02H 11/002* (2013.01); *H02H 1/0007* (2013.01)

(58) Field of Classification Search
CPC ... H02H 11/002; H02H 1/0007; H02H 7/1203
USPC ....................................................... 307/115
See application file for complete search history.

(56) References Cited

U.S. PATENT DOCUMENTS

| | | | |
|---|---|---|---|
| 8,203,235 B2 * | 6/2012 | Fox ........................ | H02J 9/062 307/64 |
| 2014/0300179 A1 | 10/2014 | Ubukata et al. | |
| 2015/0130476 A1 * | 5/2015 | Takahashi ............... | H02M 1/32 324/537 |
| 2018/0254695 A1 | 9/2018 | Igarashi et al. | |

FOREIGN PATENT DOCUMENTS

| | | |
|---|---|---|
| CN | 102064698 A | 5/2011 |
| CN | 201898330 U | 7/2011 |
| CN | 102457047 A | 5/2012 |
| CN | 103151826 A | 6/2013 |
| CN | 104811036 A | 7/2015 |
| DE | 112011106075 T5 | 11/2014 |
| JP | H6-276736 A | 9/1994 |
| JP | 2009-265740 A | 11/2009 |
| JP | 2010-15348 A | 1/2010 |
| JP | 2014-204625 A | 10/2014 |
| JP | 2014-241699 A | 12/2014 |

(Continued)

OTHER PUBLICATIONS

Office Action issued in German Patent Application No. 10 2018 113 489.4, dated Apr. 4, 2019, 13 pages.

*Primary Examiner* — Alfonso Perez Borroto
(74) *Attorney, Agent, or Firm* — Hauptman Ham, LLP

(57) ABSTRACT

A unit having a power supply circuit that converts an input voltage from an input power supply to a predetermined output voltage, includes: an output terminal configured to output the output voltage to the outside of the unit; a switch provided between the power supply circuit and the output terminal; and a switch control part configured to turn off the switch when the input voltage is not applied from the input power supply and turn on the switch when the input voltage is applied.

4 Claims, 6 Drawing Sheets

(56) References Cited

FOREIGN PATENT DOCUMENTS

| | | |
|---|---|---|
| JP | 2015-96014 A | 5/2015 |
| JP | 2016-59177 A | 4/2016 |
| JP | 2017-79566 A | 4/2017 |
| WO | 2017/038742 A1 | 3/2017 |

* cited by examiner

UNIT

CROSS-REFERENCE TO RELATED APPLICATION

This application is based upon and claims the benefit of priority from Japanese Patent Application No. 2017-115823 filed on Jun. 13, 2017, the contents of which are incorporated herein by reference.

BACKGROUND OF THE INVENTION

Field of the Invention

The present invention relates to a unit including a power supply circuit and a load protection circuit.

Description of the Related Art

Japanese Laid-Open Patent Publication No. 2010-015348 discloses a power supply circuit including a voltage regulator circuit and a switch for suspending supply of input voltage to the voltage regulator circuit when the output voltage from the voltage regulator circuit has lowered due to a short circuit or the like.

SUMMARY OF THE INVENTION

A control system for controlling a robot, a machine tool or the like, is constituted of combination of multiple units, each being connected to the others by cables and the like. Each of the multiple units is equipped with a power supply circuit, which is configured to output power to the outside via an output terminal. In this case, if the output terminal of a unit is erroneously connected to that of another unit, the power supply circuit may fail or cause an unexpected anomaly in the load (internal circuit).

Since the power supply circuit disclosed in Japanese Laid-Open Patent Publication No. 2010-015348 is one that suspends supply of input voltage to the voltage regulator circuit when the output voltage of the voltage regulator circuit has dropped, at is not possible to solve the above problem.

It is therefore an object of the present invention to provide a unit capable of preventing a breakdown of a power supply circuit and occurrence of a load anomaly even when the output terminals of the multiple units are erroneously connected to each other.

The aspect of the present invention resides in a unit having a power supply circuit that converts an input voltage from an input power supply to a predetermined output voltage, comprising: an output terminal configured to output the output voltage to the outside of the unit; a switch provided between the power supply circuit and the output terminal; and a switch control part configured to turn off the switch when the input voltage is not applied from the input power supply and turn on the switch when the input voltage is applied.

According to the present invention, even when the output terminals of multiple units are erroneously connected to each other, it is possible to prevent a breakdown of a power supply circuit and occurrence of a load anomaly in the unit.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a configuration diagram of a unit according to the second embodiment;

DESCRIPTION OF THE PREFERRED EMBODIMENTS

Preferred embodiments of the unit according to the present invention will be described in detail with reference to the accompanying drawings.

First Embodiment

Figure 1:
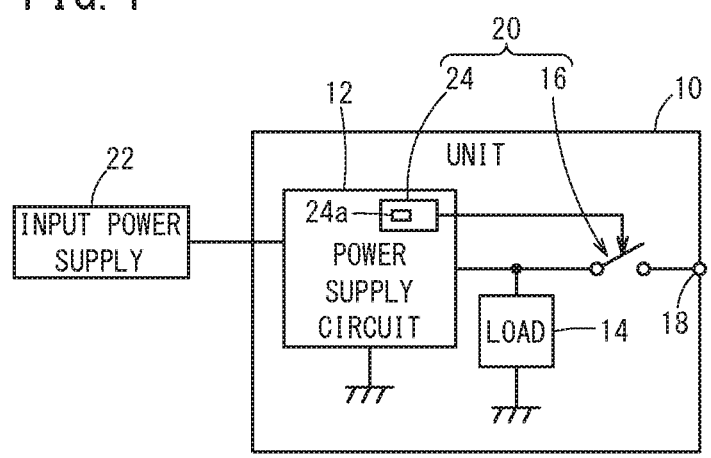
FIG. 1 is a configuration diagram of a unit according to the first embodiment.

FIG. 1 is a configuration diagram of a unit (apparatus, device, etc.) 10 according to the first embodiment. The unit 10 is, for example, a numerical control apparatus, an I/O device or the like. A plurality of units 10 are connected to each other via unillustrated connectors provided for the units 10. The unit 10 includes at least a power supply circuit 12, a load 14, a switch 16 and an output terminal 18. The unit 10 has a protection circuit 20.

The power supply circuit 12 converts the input voltage from an input power supply 22 into a predetermined output voltage. The power supply circuit 12 converts, for example, an input voltage of 24 V into an output voltage of 5 V. The output terminal 18 outputs the output voltage of the power supply circuit 12 to the outside of the unit 10. The output terminal 18 is provided in the connector provided in the unit 10. The switch 16 is disposed between the power supply circuit 12 and the output terminal 18 so as to establish and release connection between the power supply circuit 12 and the output terminal 18. The load 14 is a circuit operated by the output voltage from the power supply circuit 12.

The power supply circuit 12 includes a switch control part 24 controlling the switch 16. The switch control part 24 turns off the switch 16 when no input voltage is applied from the input power supply 22, and turns on the switch 16 when the input voltage is applied. That is, the switch 16 is turned on and off according to the on/off state of the input voltage. The switch control part 24 has a voltage detector 24a to detect the voltage applied to the unit 10 (the power supply circuit 12) from the input power supply 22, thereby determine whether or not the input voltage is being applied. The protection circuit 20 is formed of the switch 16, the switch control part 24 and the like.

Here, the switch control part 24 may have a current detector that detects the current supplied from the input power supply 22 to the unit 10 (the power supply circuit 12) to thereby determine whether or not the input voltage is being applied. The switch control part 24 is provided in the power supply circuit 12, but may be arranged outside the power supply circuit 12.

Figure 2:
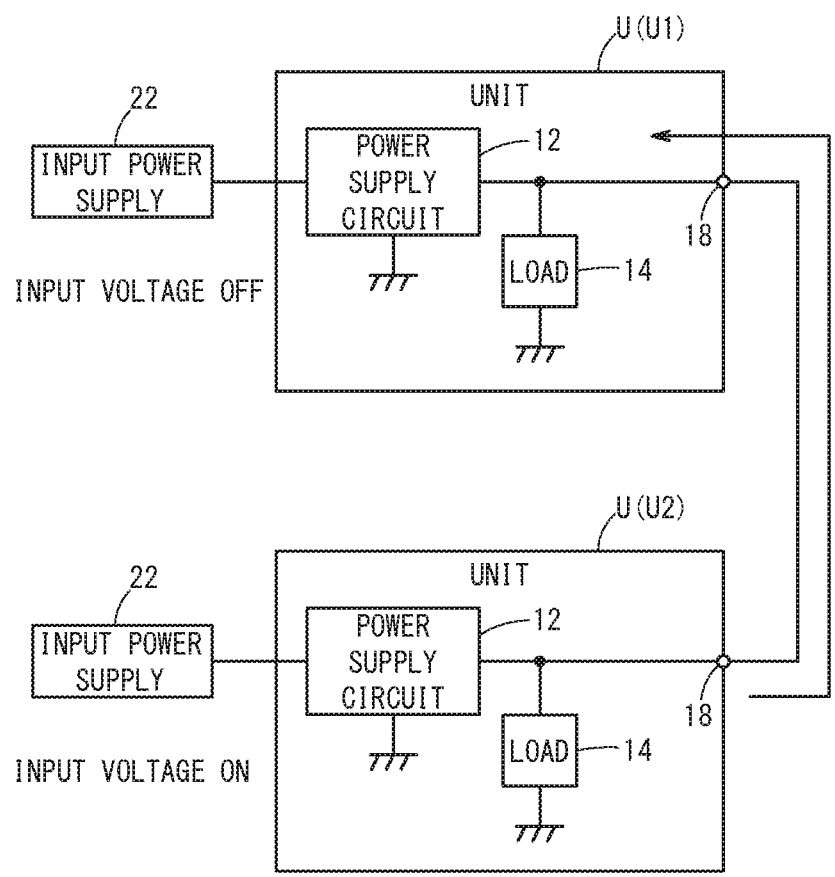
FIG. 2 is a diagram showing a state in which the output terminals of two conventional units without a switch or a switch control part are erroneously connected.

FIG. 2 is a diagram showing a state where the output terminals 18 of the two conventional units U with no protection circuit 20 are erroneously connected. In FIG. 2, the same reference numerals are allotted to the same components as those in FIG. 1. The input power supply 22 is provided for each unit U.

As shown in FIG. 2, even when the output terminals 18 of the units U are erroneously connected to each other, the overvoltage or overcurrent protection circuit provided for the power supply circuit 12 will work to stop the units U safely or the power supply circuits 12 of both units U will continue operating in cooperation with each other to avoid a breakdown of the power supply circuits 12 and occurrence of an anomaly of the load 14 as long as the input voltages are applied to both units U.

However, when no input voltage is applied to one of the units U (hereinafter referred to as U1) and the input voltage is applied to the other unit U (U2), the output voltage from the unit U2 is supplied to the power supply circuit 12 of the unit U1 from the reverse direction through the output terminal 18 of the unit U1. If, for example, the power supply circuit 12 of the unit U1 is a synchronous rectification type switching power supply, there occur some cases where the gate voltage of the switching element is raised to turn on the switching element. When the switching element of the power supply circuit 12 of the unit U1 is turned on, a large current may flow through the switching element, possibly damaging the switching element.

When the input voltage is also applied to the unit U1, a voltage (for example, 0) for turning off the switching element is applied to the gate of the switching element of the power supply circuit 12 of the unit U1, the switching element will not be turned on.

Figure 3:
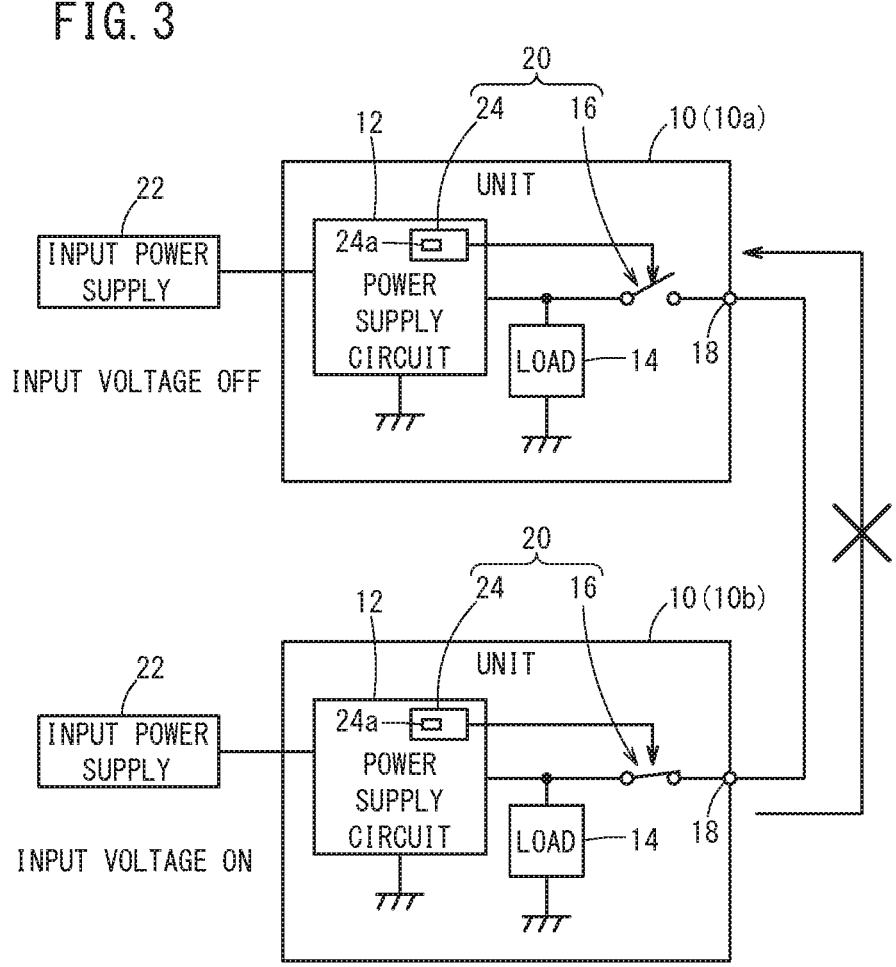
FIG. 3 is a diagram showing a state in which the output terminals of the two units of the first embodiment are erroneously connected.

FIG. 3 is a diagram showing a state in which the output terminals 18 of the two units 10 of the first embodiment are erroneously connected to each other. The input power supply 22 is provided for each of the units 10. In the description of FIG. 3, the unit 10 to which no input voltage is applied is referred to as a unit 10a, and the unit 10 to which the input voltage is applied is referred to as a unit 10b.

Since the input voltage is not applied to the unit 10a, the switch 16 of the unit 10a is turned off. Therefore, even when the output terminals 18 of the unit 10a and the unit 10b are erroneously connected to each other, the output voltage from the unit 10b will not be supplied from the reverse direction to the power supply circuit 12 of the unit 10a via the output terminal 18 of the unit 10a.

Accordingly, it is possible to prevent a breakdown of the power supply circuit 12 and occurrence of an anomaly of the load 14 in the unit 10a.

Although there is a method using a diode to prevent the input of current from the outside, this method can reduce voltage drop and steady loss as compared to use of the diode.

Second Embodiment

Figure 4:
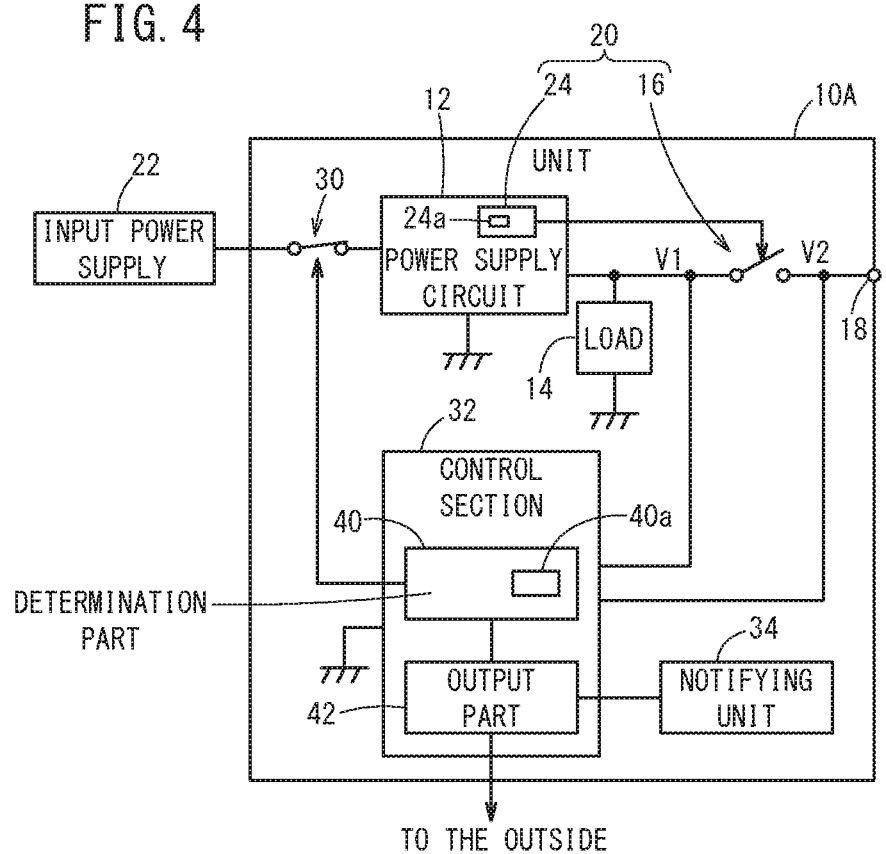

FIG. 4 is a configuration diagram of a unit 10A of the second embodiment. In FIG. 4, the same components as those shown in FIG. 1 are allotted the same reference numerals, and description thereof is omitted.

The unit 10A includes a power supply circuit 12, a load 14, a switch 16, an output terminal 18, a second switch 30, a control section 32, and a notifying unit 34. Also in FIG. 4, a switch control part 24 is provided in the power supply circuit 12, but may be arranged outside the power supply circuit 12.

The second switch 30 is disposed between an input power supply 22 and the power supply circuit 12 so as to establish and release connection between the input power supply 22 and the power supply circuit 12. The second switch 30 may be a normally-on switch.

The control section 32 includes a determination part 40 and an output part 42. The determination part 40 includes a voltage detector 40a that detects a first voltage V1 on the power supply circuit 12 side of the switch 16 and a second voltage V2 on the output terminal 18 side of the switch 16. It is assumed that the control section 32 is driven by one of the first voltage V1 and the second voltage V2. The determination part 40 determines whether or not the second voltage V2 is higher than the first voltage V1. The determination part 40 outputs the determination result to the output part 42. When the determination part 40 determines that the second voltage V2 is higher than the first voltage V1, the determination part 40 turns off the second switch 30.

Since the control section 32 is driven by one of the first voltage V1 and the second voltage V2, the control section 32 will not stop driving even if the second switch 30 is turned off when the second voltage V2 is higher than the first voltage V1.

Now, the reason why the determination part 40 judges whether or not the second voltage V2 is higher than the first voltage V1 will be described. When, with the input voltage to one unit 10A off and the input voltage to the other unit 10A on, these two units 10A are erroneously connected to each other at their output terminals, the second voltage V becomes higher than the first voltage V1. Therefore, it is possible to determine whether or not the output terminals 18 are erroneously connected to each other by comparing the second voltage V2 and the first voltage V1.

When the determination part 40 determines that the second voltage V2 is higher than the first voltage V1, the output part 42 outputs an alarm signal. The output part 42 outputs the alarm signal to the notifying unit 34.

The notifying unit 34, in response to the alarm signal, gives an alarm to the operator. For example, the notifying unit 34 may have a display unit such as a liquid crystal display and display information indicating an alarm to warn the operator. In addition, the notifying unit 34 may include a speaker giving off sound or a light emitter emitting light to output an alarm sound from the speaker, or cause the light emitter to emit light, thereby warning the operator.

The output part 42 may output an alarm signal to an external device. In this case, the output part 42 does not have to output the alarm signal to the notifying unit 34. As receiving an alarm signal from the output part 42, the external device may, in response to the alarm signal, notify the operator of the alarm or further transfer the alarm signal to another external device.

When the determination part 40 determines that the second voltage V2 is higher than the first voltage V1, the second switch 30 is turned off so as to hold the alarm state. For example, in a configuration where no second switch 30 is provided, when the second voltage V2 has been determined to be higher than the first voltage V1 to give an alarm or the like and thereafter the input power supply 22 is turned on, the second voltage V2 and the first voltage V1 becomes equal to each other so that the determination part 40 cancels the alarm. However, in the present embodiment where the second switch 30 is provided, when the second voltage V2 has been determined to be higher than the first voltage V1, the second switch 30 is turned off so that the alarm state can be held.

Figure 5:
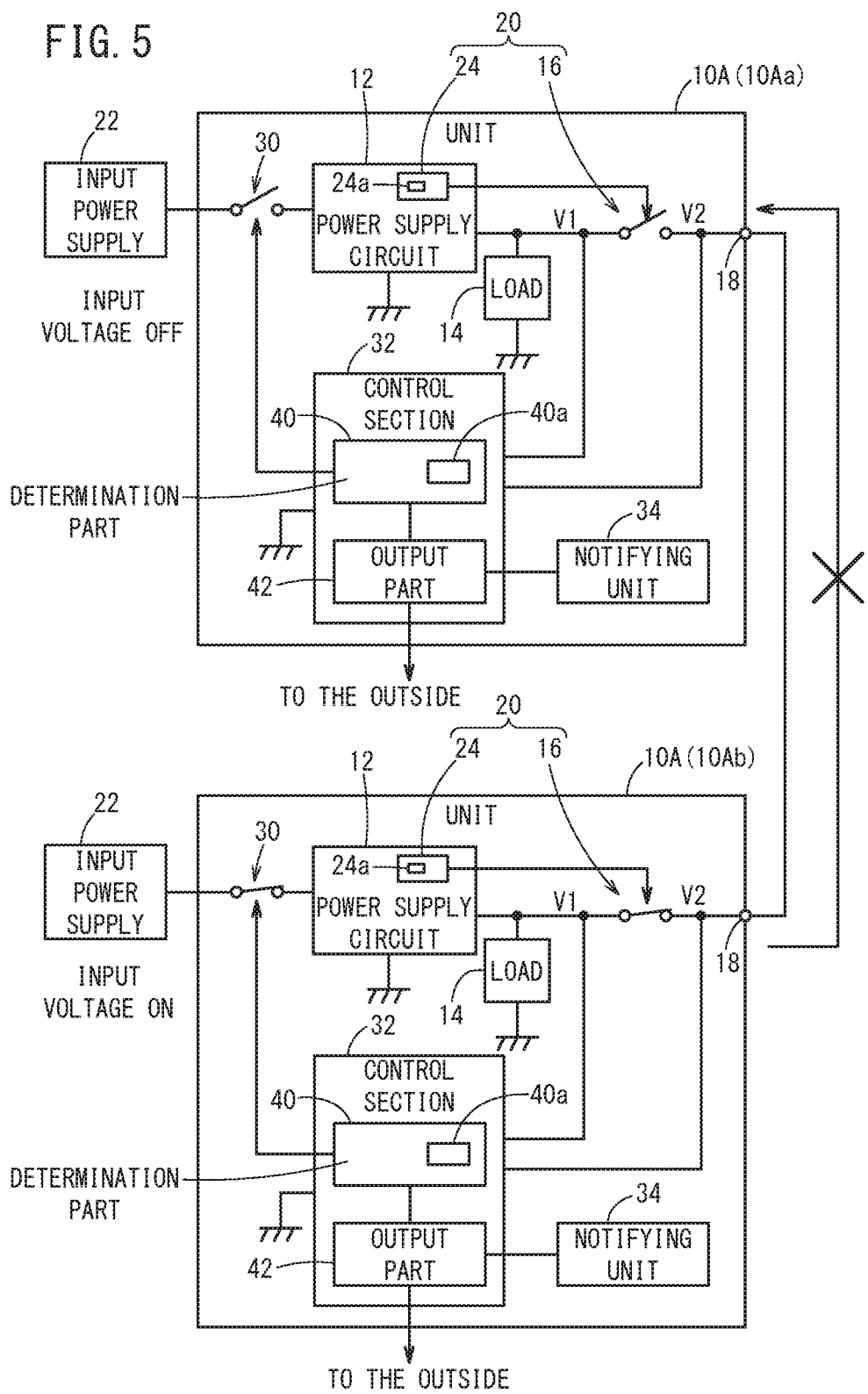
FIG. 5 is a diagram showing a state in which the output terminals of the two units of the second embodiment are erroneously connected.

FIG. 5 is a diagram showing a state in which the output terminals 18 of the two units 10A of the second embodiment are erroneously connected. The input power supply 22 is provided for each of the units 10A. In the description of FIG. 5, the unit 10A to which no input voltage is applied is referred to as a unit 10Aa, whereas the unit 10A to which an input voltage is applied is referred to as a unit 10Ab.

Since no input voltage is applied to the unit 10Aa, the switch 16 of the unit 10Aa is in the off state. Therefore, even when the output terminals 18 of the unit 10Aa and the unit 10Ab are erroneously connected to each other, the output voltage will not be applied from the reverse direction from the unit 10Ab to the power supply circuit 12 of the unit 10Aa via the output terminal 18 of the unit 10Aa. Therefore, it is possible to prevent a breakdown of the power supply circuit 12 and occurrence of an anomaly of the load 14 in the unit 10Aa.

Further, as to the unit 10Aa, since the second voltage V2 is higher than the first voltage V1, the determination part 40 turns off the second switch 30 so that the notifying unit 34 gives an alarm. Thus, the operator can recognize that the output terminals 18 are erroneously connected to each other.

When the input voltage is also input to the unit 10Aa, the switch 16 of the unit 10Aa is turned on and the first voltage V1 and the second voltage V2 become equal, so that no alarm is given, hence the second switch 30 will not be turned off.

Figure 6:
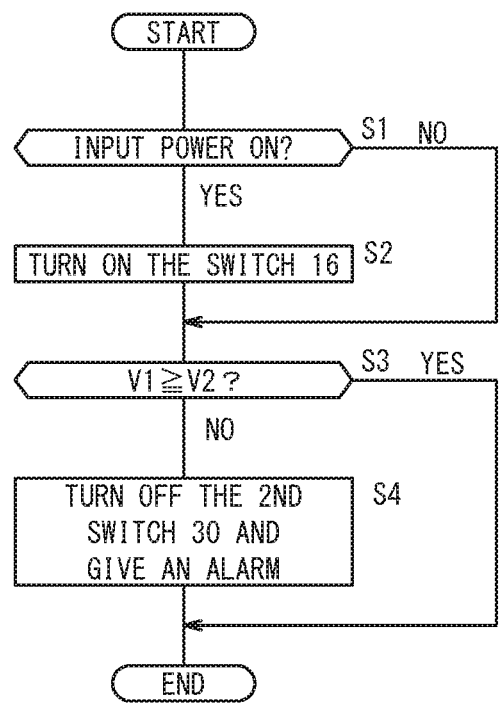
FIG. 6 is a flowchart showing the operation of the unit according to the second embodiment.

Next, the operation of the unit 10A of the second embodiment will be described with reference to FIG. 6. In the description of FIG. 6, it is assumed that the switch 16 is a normally-off switch and the second switch 30 is a normally-on switch.

At step S1, the switch control part 24 determines whether or not the input voltage is on. That is, the switch control part 24 determines whether or not the input voltage from the input power supply 22 is applied to the unit 10A. If it is determined at step S1 that the input voltage is on, the control goes to step S2, where the switch control part 24 turns on the switch 16, and proceeds to step S3. On the other hand, if it is determined at step S1 that the input voltage is off, the control directly goes to step S3.

At step S3, the determination part 40 determines whether or not the second voltage V2 is equal to or lower than the first voltage V1. If it is determined at step S3 that the second voltage V2 is not equal to or lower than the first voltage V1, that is, the second voltage V2 is higher than the first voltage V1, the control proceeds to step S4. On the other hand, if it is determined at step S3 that the second voltage V2 is equal to or lower than the first voltage V1, the current control is terminated.

At step S4, the determination part 40 turns off the second switch 30, and the notifying unit 34 gives an alarm to the operator, and then the control is terminated.

VARIATIONAL EXAMPLES

The second embodiment described above can also be modified as follows.

Variational Example 1

In the second embodiment, the second switch 30 and the notifying unit 34 are provided, but at least one of the second switch 30 and the notifying unit 34 can be omitted.

Variational Example 2

In the second embodiment, the switch control part 24 is configured to control the switch 16 according to the on/off of the input voltage. However, the determination part 40, instead, may be configured to control the switch 16. In this case, the determination part 40 may be configured to turn on the switch. 16 when the second voltage V2 is equal to or lower than the first voltage V1 and turn off the switch 16 when the second voltage V2 is higher than the first voltage V1.

Variational Example 3

The above first and second variational examples may be combined to realize a third variational example.

Technical Ideas Obtained from the Embodiments

Technical ideas that can be grasped from each of the embodiments (including the variational examples) are described below.

A unit (10, 10 A) having a power supply circuit (12) for converting an input voltage from an input power supply (22) to a predetermined output voltage, includes: an output terminal (18) configured to output the output voltage to the outside of the unit (10, 10A); a switch (16) provided between the power supply circuit (12) and the output terminal (18); and a switch control part (24) configured to turn off the switch (16) when the input voltage is not applied from the input power supply (22) and turn on the switch (16) when the input voltage is applied.

As a result, even when the output terminals (18) of the units (10, 10A) are erroneously connected to each other, it is possible to prevent a breakdown of the power supply circuit (12) and occurrence of an anomaly of the load (14) in the unit (10, 10A).

The unit (10A) may further include: a determination part (40) configured to compare a first voltage (V1) on the power supply circuit (12) side of the switch (16) with a second voltage (V2) on the output terminal (18) side of the switch (16) to determine whether or not the second voltage (V2) is higher than the first voltage (V1); and an output part (42) configured to output an alarm signal when the determination part (40) has determined that the second voltage (V2) is higher than the first voltage (V1). This configuration makes it possible to notify the operator of the alarm. It is also possible through an external device to confirm that the output terminals (18) of the units (10A) are connected to each other.

The unit (10A) may further include a notifying unit (34) configured to give an alarm in response to the alarm signal. This enables the operator to recognize that the output terminals (18) of the unit (10A) are erroneously connected to each other.

The unit (10A) may further include a second switch (30) disposed between the input power supply (22) and the power supply circuit (12). The determination part (40) may be configured to turn off the second switch (30) when the second voltage (V2) is determined to be higher than the first voltage (V1). This configuration enables holding of an alarm state. That is, when the second voltage (72) has been determined to be higher than the first voltage (V1) and thereafter the input power supply (22) is turned on, the second voltage (V2) becomes equal to the first voltage (V1) so that the alarm state is canceled by the determination part (40). However, in this configuration, the second switch (30) is turned off so that the alarm state can be held.

The switch control part (24) may be configured to detect the voltage applied from the input power supply or the current supplied therefrom to determine whether or not the input voltage is applied from the input power supply (22). This configuration makes it possible to automatically judge whether or not the input voltage is applied from the input power supply (22).

Although the present invention has been described with reference to the embodiments, the technical scope of the present invention should not be limited to the scope described in the above embodiments. It goes without saying that various modifications and/or improvements can be added to the above embodiment. It is obvious from the description of the scope of the claims that modes with such modifications and/or improvements can be included in the technical scope of the present invention.

What is claimed is:

1. A unit, comprising:
   a power supply circuit configured to convert an input voltage from an input power supply to a predetermined output voltage;
   an output terminal configured to output the output voltage to the outside of the unit;
   a switch provided between the power supply circuit and the output terminal, the switch having
      a first contact on a power supply circuit side of the switch, and
      a second contact on an output terminal side of the switch;
   a switch control part configured to
      turn off the switch to electrically disconnect the first contact from the second contact, in response to the input voltage not applied from the input power supply to the power supply circuit, and
      turn on the switch to electrically connect the first contact and the second contact, in response to the input voltage applied to the power supply circuit;
   a determination part coupled to the first and second contacts of the switch via first and second connections, respectively, the determination part configured to compare a first voltage, which is a real-time voltage on the first contact of the switch, with a second voltage, which is a real-time voltage on the second contact of the switch to determine whether or not the second voltage is higher than the first voltage; and
   an output part configured to output an alarm signal in response to the determination part determining that the second voltage is higher than the first voltage.

2. The unit according to claim 1, further comprising a notifying unit configured to give an alarm in response to the alarm signal.

3. The unit according to claim 1, further comprising a second switch disposed between the input power supply and the power supply circuit, wherein the determination part is configured to turn off the second switch in response to a determination that the second voltage is higher than the first voltage.

4. The unit according to claim 1, wherein the switch control part is configured to detect the voltage applied from the input power supply or the current supplied from the input power supply to determine whether or not the input voltage is applied from the input power supply.

* * * * *